US009485425B1

(12) United States Patent
Swift

(10) Patent No.: US 9,485,425 B1
(45) Date of Patent: Nov. 1, 2016

(54) SYSTEM THAT CONSERVES POWER OF A BATTERY-POWERED STREAMING VIDEO CAMERA

(71) Applicant: Stephen Edwin Swift, Duarte, CA (US)

(72) Inventor: Stephen Edwin Swift, Duarte, CA (US)

(73) Assignee: Pet Time Inc., Duarte, CA (US)

( * ) Notice: Subject to any disclaimer, the term of this patent is extended or adjusted under 35 U.S.C. 154(b) by 1 day.

(21) Appl. No.: 14/464,176

(22) Filed: Aug. 20, 2014

Related U.S. Application Data

(60) Provisional application No. 61/868,013, filed on Aug. 20, 2013.

(51) Int. Cl.
*H04N 5/232* (2006.01)
*H04N 5/77* (2006.01)

(52) U.S. Cl.
CPC ...... *H04N 5/23241* (2013.01); *H04N 5/23203* (2013.01); *H04N 5/23296* (2013.01); *H04N 5/772* (2013.01)

(58) Field of Classification Search
CPC .............. H04N 5/23241; H04N 5/23203; H04N 5/232; H04N 5/23293; H04N 5/23216; H04N 5/23245; H04N 2101/00; H04N 5/2251; H04N 5/2252; H04N 5/23206; H04N 5/23296; H04N 5/772; H04N 2201/0084
USPC ........ 348/114, 211.99, 211.8, 208.16, 231.4, 348/333.13, 372
See application file for complete search history.

(56) References Cited

U.S. PATENT DOCUMENTS

| | | | |
|---|---|---|---|
| 5,911,198 A * | 6/1999 | Curen ................. | A01K 15/021 119/720 |
| 7,068,316 B1 * | 6/2006 | Pine ..................... | H04N 3/155 348/294 |
| 7,643,056 B2 * | 1/2010 | Silsby ............. | G08B 13/19658 348/143 |
| 2003/0025792 A1 * | 2/2003 | Eberhard .............. | H04N 7/183 348/143 |
| 2003/0116101 A1 * | 6/2003 | Kim ..................... | A01K 15/021 119/720 |
| 2006/0011145 A1 * | 1/2006 | Kates ................... | A01K 15/021 119/719 |
| 2007/0266959 A1 * | 11/2007 | Brooks ................ | A01K 11/008 119/720 |
| 2009/0270138 A1 * | 10/2009 | Raveendran ......... | H04N 21/443 455/574 |
| 2011/0032430 A1 * | 2/2011 | Prieto ................. | G09G 3/3406 348/687 |
| 2011/0185204 A1 * | 7/2011 | Louboutin ............. | G06F 1/263 713/320 |
| 2013/0250047 A1 * | 9/2013 | Hollinger ............ | H04N 5/2252 348/36 |
| 2014/0267811 A1 * | 9/2014 | Bhat .................. | H04N 5/23241 348/208.16 |
| 2015/0112883 A1 * | 4/2015 | Orduna ................ | G06Q 50/265 705/325 |
| 2015/0130935 A1 * | 5/2015 | Siann .................... | H04N 7/185 348/143 |
| 2015/0181117 A1 * | 6/2015 | Park ................... | H04N 5/23216 348/372 |

* cited by examiner

*Primary Examiner* — Hung Lam
(74) *Attorney, Agent, or Firm* — Vested Law

(57) ABSTRACT

A system for conserving power of a battery powered accelerometer controlled Wi-Fi streaming video camera is disclosed. The system conserves power by allowing for Wi-Fi and video streaming to be turned on only during certain events and for video quality to be adjusted based on battery life. Some embodiments of the systems allow for a real time point of view streaming video device to be connected to a subject without having to constantly be connected via Wi-Fi. The system also allows for video quality to be adjusted both manually and automatically to maximize battery life.

10 Claims, 4 Drawing Sheets

SYSTEM THAT CONSERVES POWER OF A BATTERY-POWERED STREAMING VIDEO CAMERA

CLAIM OF BENEFIT TO PRIOR APPLICATION

This application claims benefit to U.S. Provisional Patent Application 61/868,013, entitled "EFFICIENT BATTERY POWERED STREAMING VIDEO CAMERA," filed Aug. 20, 2013. The U.S. Provisional Patent Application 61/868,013 is incorporated herein by reference.

BACKGROUND

Embodiments of the invention described in this specification relate generally to power-saving video cameras, and more particularly, to power-saving video streaming cameras.

Connecting with other people and pets 24 hours per day is not possible. People have used video cameras to stream video over Wi-Fi to capture moments with other people and pets, but these cameras only capture what is going on in the location where they are set up. Cameras of this type are not movable because they receive power via a connection to a wall outlet. The other option to connect with people and pets is to stream video via Wi-Fi from a self-contained device, which draws power from a battery instead of a wall outlet, attached to the subject. However, streaming video via Wi-Fi is extremely power intensive. Such a device, streaming video and maintaining a Wi-Fi connection while powered by battery, would quickly run out of power.

Streaming video and maintaining a Wi-Fi connection is power intensive. Many of the devices that exist must be plugged into a wall outlet because of their continuous power consumption requirements. Yet continuously streaming video of a remote subject generally serves little purpose. For example, there is no guarantee that the subject will always be in the location of this type of device. Alternative devices attach to the subject and record video, which can only be downloaded, edited, and/or viewed at a later date. In other words, this second class of device is not capable of streaming video over Wi-Fi or other network connection. While this approach provides constant video of the subject, is unconstrained by location, and is not as power intensive, such an approach has limited usefulness for users that want to connect with the subject via remote video in real time. A third class of device attach to the subject and stream video, but do not provide battery management features or automated event detection for triggering the device to perform power-related operations.

Therefore, what is needed is a way to allow for Wi-Fi and video streaming to be turned on only during certain events and for video quality to be adjusted based on battery life.

BRIEF DESCRIPTION

According to an embodiment of the present invention, a system conserves battery power in a wireless streaming video device. The system includes a battery, a camera, an image processing module, a wireless module, an accelerometer sensor, and a microprocessor that includes an internal clock. The microprocessor is programmed to monitor the accelerometer sensor for an event condition, to monitor the internal clock for an event condition, and to send a push message to a user in response to an event condition. The microprocessor is programmed to receive a remote instruction from the user and to activate the camera and the image processing module based on the remote instruction from the user. The microprocessor is programmed to adjust processing of video received from the camera based on a power level of the battery.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
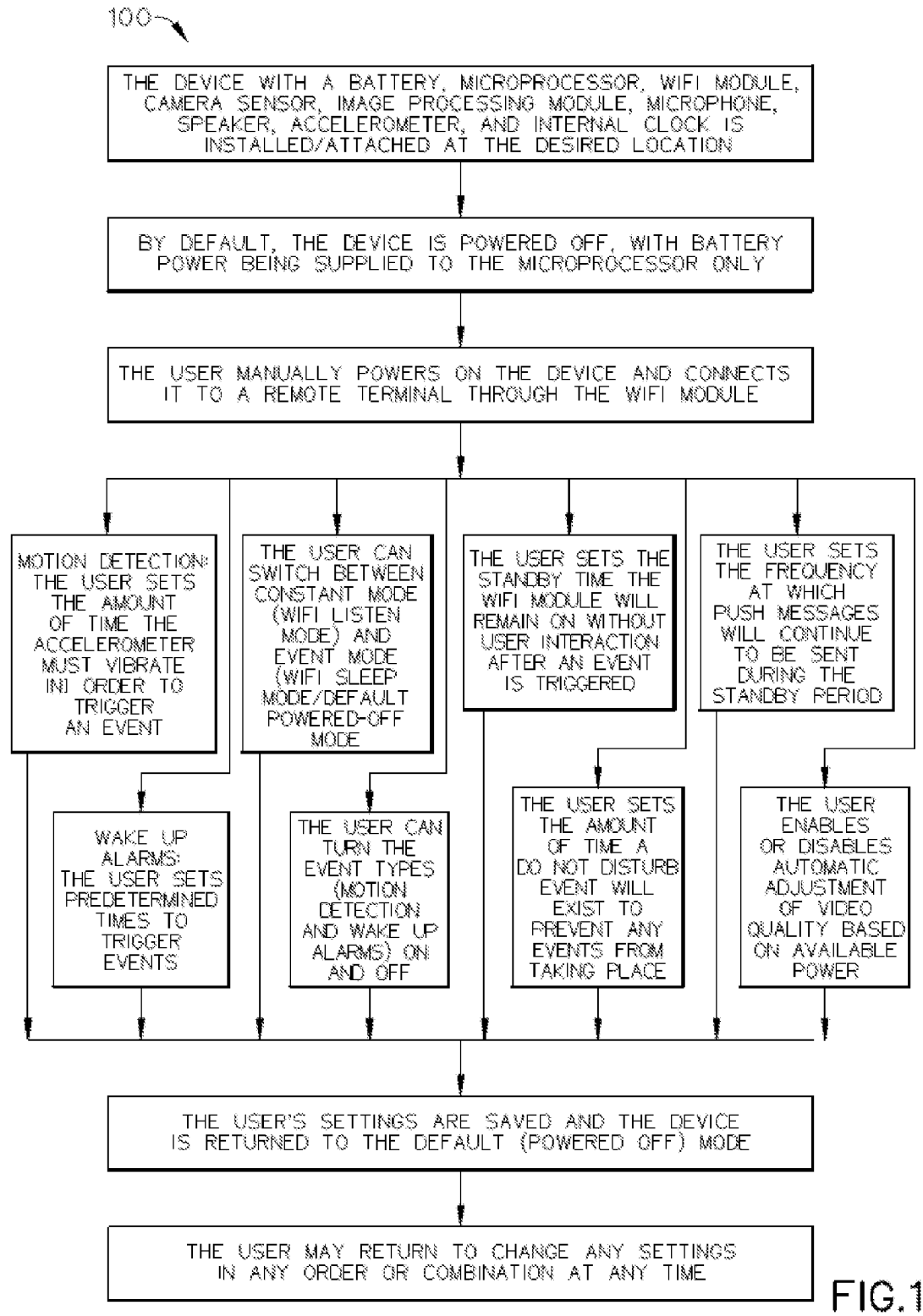
FIG. 1 conceptually illustrates a process for programming a system that conserves power of a battery-powered streaming video camera in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the streaming video camera battery power conservation system include an efficient battery-powered wireless streaming video device. The wireless streaming video device includes a battery, a camera, an image processing module, a wireless module, an accelerometer sensor, and a microprocessor that includes an internal clock. The microprocessor is programmed to monitor each of the accelerometer sensor and the internal clock for an event condition and, when an event condition is detected, to send a push message to a computing device of a user in response to the detected event condition. The microprocessor is programmed to receive a remote instruction from the computing device of the user and to activate the camera and the image processing module based on the remote instruction received from the user computing device. The microprocessor is programmed to adjust processing of video received from the camera based on a power level of the battery.

Embodiments of the battery power conservation system and battery-only streaming video device differ from and improve upon currently existing video streaming options, and there are no similar devices or systems to date. Previous means for remotely streaming video of a subject, such as by a so-called nanny camera, requires the device to be plugged into a wall outlet due to the intensive power requirements for streaming the video. Other previous means for capturing point of view video of a subject either do not stream real time video of subjects (due to high power consumption of wireless or network transmission of video) or do not automatically turn on when one or more trigger events are detected. For devices that do not stream real time video, people have had to connect their video recording devices to a subject to view the subject's point of view, but had to wait to view the video, edit the video, or otherwise work with the video because the video was not streamed in real time. Thus, non-streamed video was typically downloaded from such video devices, and then edited and/or viewed at a future date. Additionally, none of the existing video devices capable of real-time streaming have included power-conservation methods based on automated, event-based triggers for providing battery power to the video device. In contrast, according to certain embodiments of the present invention, a device may manage remote streaming video of a subject's point of view. For example, the device may enable Wi-Fi connectivity of the device if an accelerometer or timed event condition is reached (e.g., a specific time moment being detected by an internal clock). Once connectivity has been enabled, the user may be able to choose remotely whether or not he wants to stream video, keep the device in Wi-Fi only mode, or completely turn the device off until the next event. The device may adjust video quality in order to maximize battery life so that the device can function as a completely self-contained unit and not be required to be connected to a wall outlet.

By way of example, FIG. 1 conceptually illustrates a process 100 for programming a system that conserves power of a battery-powered streaming video camera. As shown in this figure, the battery-powered streaming video camera is installed at a location or attached to a subject. By default, the device is not powered on. In some embodiments, only the microprocessor of the streaming video camera is provided power from the battery. The battery-powered streaming video camera is then powered up. Battery power can be forced on locally anytime manually by the user to supply battery power to the device. For example, the user may manually turn on power to the device. Once powered-up, the video device is connected to a remote terminal through the Wi-Fi module.

When battery power is forced on manually by the user, battery power can be supplied to the microprocessor and Wi-Fi only, excluding the camera sensor, image processing module, microphone, and/or speaker. If the device is forced on, a remote computer terminal can connect via the Wi-Fi module to the microprocessor of the device to set or reset any or all event conditions. Thus, the user can program the battery-powered streaming video camera by remote terminal connection through the Wi-Fi module. Programmable configuration parameters include, for example, an amount of time an accelerometer in the device must vibrate before it triggers the microprocessor to turn on the Wi-Fi, a time of day to turn on the Wi-Fi, whether or not the video quality may be automatically adjusted based on power availability, and a standby time for the device to be Wi-Fi enabled without user interaction before it shuts off.

In some embodiments, the programmable configuration parameters are organized in association with one or more operational modes. Specifically, in some embodiments, a set of operational modes includes a constant Wi-Fi listen mode, an event-based Wi-Fi sleep mode/default powered off mode, and a standby mode. In this way, the user can program the configuration settings in relation to one or more of the operational modes. Thus, as shown in FIG. 1, the user has the ability to (i) switch between constant Wi-Fi mode and event-based Wi-Fi mode, (ii) choose whether motion detection and time of day event triggers are active (when in event-based Wi-Fi mode), (iii) specify an amount of time a do not disturb configuration setting will remain active to prevent triggers based on events, and (iv) specify a rate or frequency at which push messages will be sent to the user during standby mode.

Once programmed, the user's settings are saved and the video streaming device is powered off. If the battery-powered wireless streaming video device is not already connected to a subject, the device is then connected to the subject. Also, the device is connected to the subject without having to constantly be connected via Wi-Fi.

The battery power conservation system and streaming video device of the present disclosure may be comprised of the following elements. This list of possible constituent elements is intended to be exemplary only and it is not intended that this list be used to limit the battery power conservation system or streaming video device of the present application to just these elements. Persons having ordinary skill in the art relevant to the present disclosure may understand there to be equivalent elements that may be substituted within the present disclosure without changing the essential function or operation of the system and streaming video device.

1. Battery
 2. Micro Processor
 3. Wi-Fi module
 4. Camera Sensor
 5. Image Processing Module
 6. Microphone
 7. Speaker
 8. Accelerometer
 9. Microprocessor Internal Clock
 10. Remote Computer Terminal As described above by reference to FIG. 1, event conditions may be configured in any order, in any combination, and at any time. Under normal conditions with the device in the off position and battery power supplied to the microprocessor only, an event must happen before the device may power on the Wi-Fi module and the camera may be activated. For example, the vibration time of the accelerometer may exceed the elapsed time specified by the user. As an additional example, the clock time of the microprocessor internal clock may reach a user specified time of day. When an activation event occurs, the Wi-Fi module of the device may power on and enter standby mode. A push message may be sent to the user, e.g., by phone and or web portal, to let the user know that the device has been activate. The message may contain details related to the activation event. Once the device is in standby, the user may choose to stream video and/or two-way audio, to leave the device in standby, or to shut off the device. If the user decides to stream video, the entire circuit may turn on, including, e.g., the camera sensor, the image processing module, the speaker, and/or the microphone. The device may start to stream video and/or two-way audio. If streaming video is turned on and the circuit is set to automatically adjust video quality, resolution and frame rate and/or compression may adjust automatically as available battery power decreases. If standby is selected, the circuit may stay in standby, power to the microprocessor and Wi-Fi module only, for a predetermined amount of time set by the user. If no activity is recognized during the standby period, the entire circuit may shut off with power only being supplied to the microprocessor. If the user decides to shut-off the device, power may be supplied to the microprocessor only.

Video quality may affect the amount of data that is sent over the device's Wi-Fi connection and thus may impact power consumption. For example, a better video quality may be associated with transmission of more data, which in turn may consume more power. Similarly, lower video quality may be associated with decreased data transmission and lower power consumption. Therefore, in some embodiments, the battery-powered wireless streaming video device allows for video quality to be adjusted both manually and automatically to maximize battery life. As a general rule, the higher the data rate, the more power that may be consumed.

Inversely, a higher data rate may result in a higher quality of the video. Thus, there may be a trade-off between video quality and how long the device can be used. For example, VGA quality video at 15 frames/second and 100:1 compression may result in a transmission rate of 737 Kb/s; QVGA video at 10 frames/sec and 50:1 compression, 164 Kb/s; and CIF video at 5 frames/second and 25:1 compression, 324 Kb/s. Video quality may be controlled by the user, automatically controlled by the device, or both. For example, if user control is selected, the user may be able to choose different combinations of resolution, frame rate, and/or compression level to control video quality and therefore power consumption. If automatic control is selected, the device may be able to detect the power remaining in the battery and change the video configuration to prolong operational life of the device.

Figure 2:
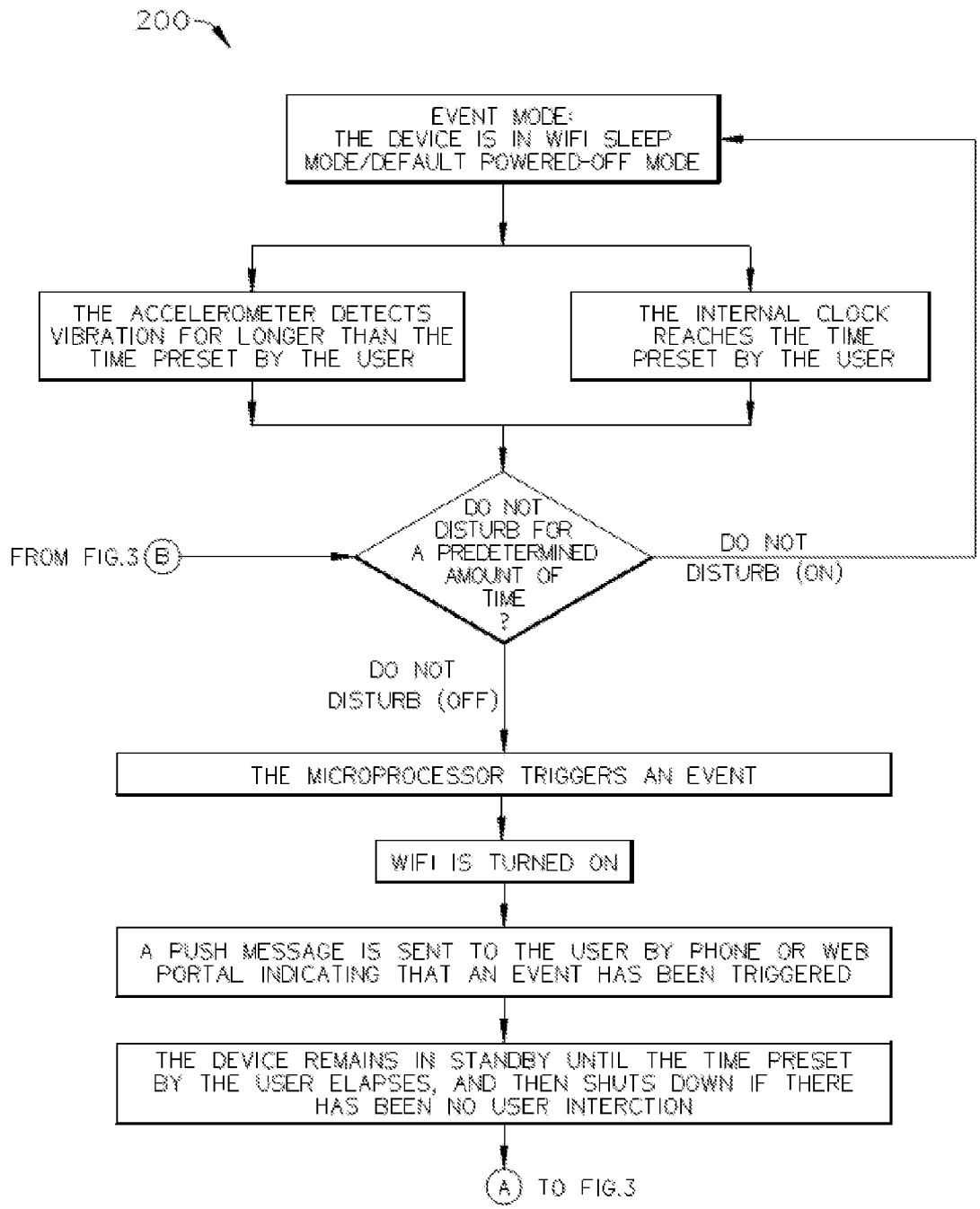
FIG. 2 conceptually illustrates a process in some embodiments for conserving power of a battery-powered streaming video camera.

In some embodiments, the streaming video camera battery power conservation system conserves power in at least two ways when the battery-powered wireless streaming video device is connected to the subject. By way of example, FIGS. 2 and 3 conceptually illustrate a process 200 and 300 for conserving power of a battery-powered video camera.

As shown in these figures, the system of some embodiments conserves power in a first way by constraining the amount of power that is provided to the battery-powered wireless streaming video device so that the battery-powered wireless streaming video device powers up only when at least one event condition in a set of event conditions is detected. Otherwise, the battery-powered wireless streaming video device will normally be completely off. The set of event conditions includes a first event condition that is triggered when an accelerometer of the streaming video device vibrates for a threshold amount of time and a second event condition that is triggered when an internal clock of the streaming video device reaches one or more predetermined times throughout the day established by the user. When at least one event condition is detected, the streaming video device's Wi-Fi will automatically turn on.

Additionally, in some embodiments, the battery power conservation system sends a push message to the user when at least one event condition is detected. The push message sent to the computing device of the user requesting the user to identify a power usage option from a set of power usage options comprising (i) controlling the battery-powered wireless streaming video device to stream video captured from the subject's point of view, (ii) maintain an exclusive Wi-Fi only mode of power consumption, and (iii) completely powering down the streaming video device and/or keeping the power of the streaming video device off until the next event condition is triggered, thereby using power only when needed. Thus, at this point, the user may interact with the system to control the device remotely to stream video, keep the device in Wi-Fi only mode, or completely turn the device off until the next event, thereby ensuring that the device may only use power when operation of the device is desired by the user.

Figure 3:
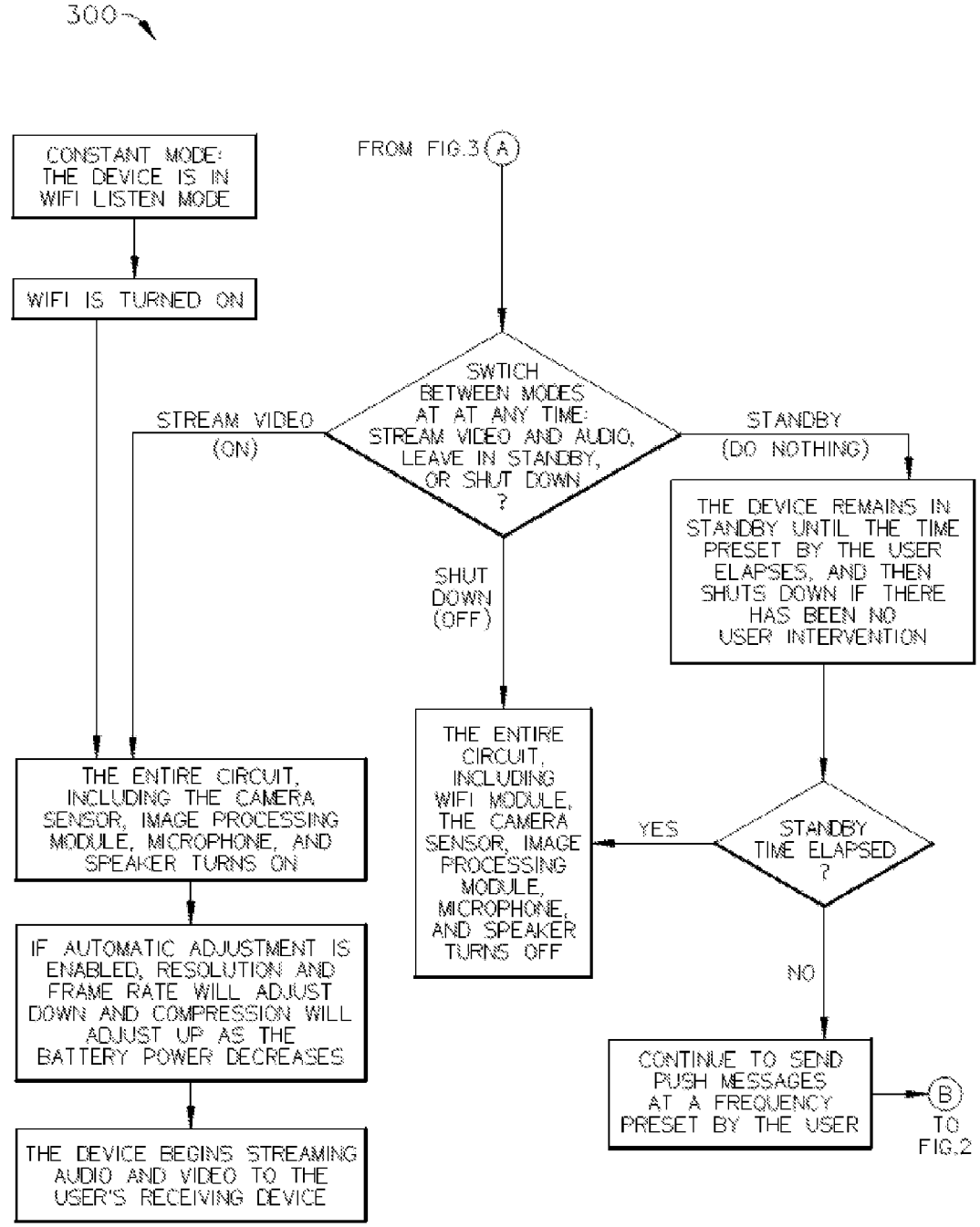
FIG. 3 conceptually illustrates a continuation of the process for conserving power of a battery-powered streaming video camera.

In a second way of conserving power, as shown in FIG. 3, the system of some embodiments adjusts the resolution, compression, and frame rate of the battery-powered wireless streaming video device either automatically or by manual user interaction. Adjusting one or more of the resolution, compression, and frame rate of the battery-powered wireless streaming device results in power savings in processing videos while streaming. In this way, the amount of power used for processing video may be controlled to manage battery life of the device.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
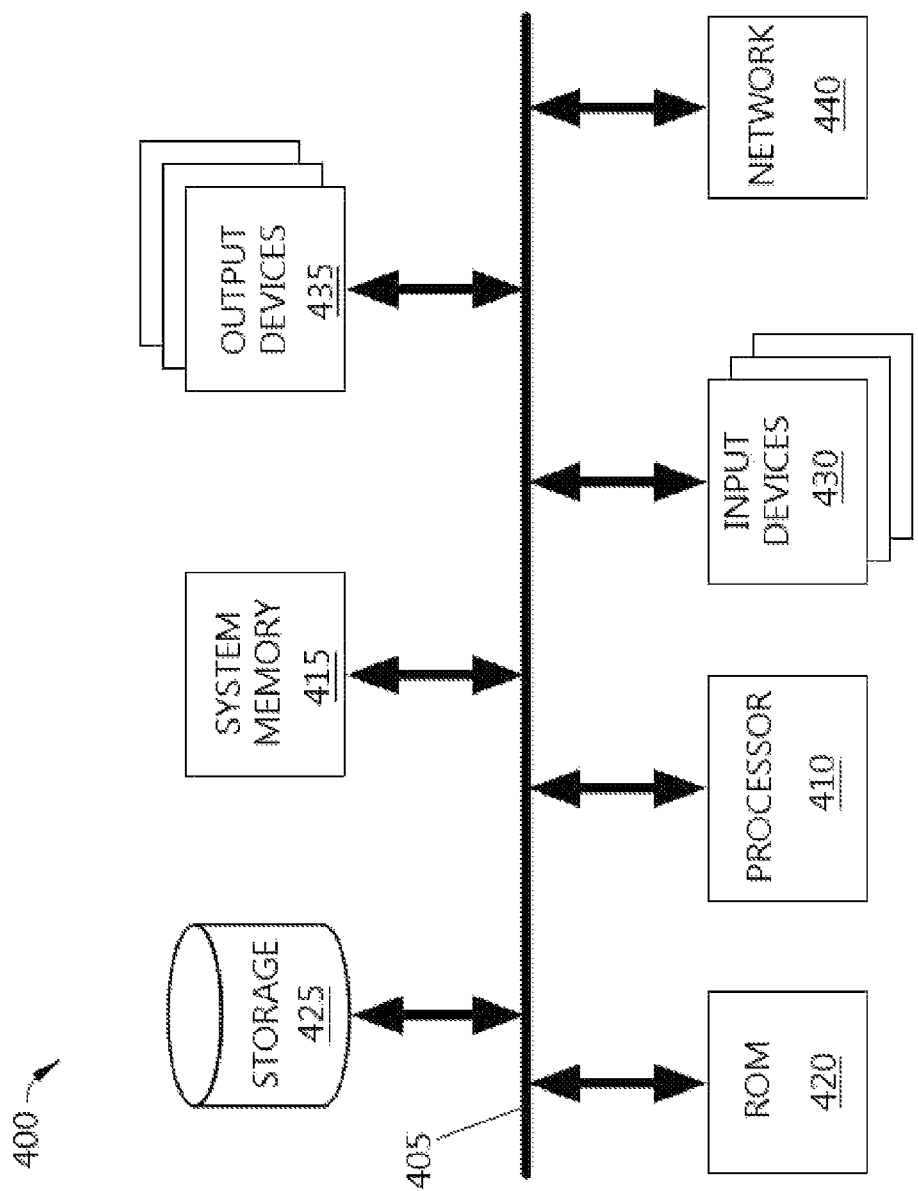
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-3 conceptually illustrate processes for configuring power conservation settings and for conserving power of battery-powered wireless streaming video devices. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A system that conserves battery power in a real time streaming video device, the system comprising:
    a battery that provides power to the real time streaming video device;
    a camera configured to capture sequences of video images;
    an image processing module that is configured to adjust the quality of the video images based on one or more of a streaming bit rate, resolution, frame rate, or compression to transmit the captured sequences of video images;
    a wireless module that establishes a Wi-Fi network connection over which to stream the captured sequences of video images;
    an accelerometer sensor that detects movements of the real time streaming video device; and
    a processing unit programmed to:
        monitor the accelerometer sensor for an event condition as a result of detected movement;
        monitor the internal clock for an event condition as a result of a timed event condition;
        send a push message to a remote user in response to a detected event condition, the push notification requesting the remote user to provide an instruction related to real time power usage of the system;
        receive the remote instruction from the user;
        activate the camera and the image processing module based on the remote instruction received from the user; and
        adjust processing of video received from the camera based on a power level of the battery.

2. The system of claim 1 further comprising a microphone that receives audio that can be adjusted for different streaming bit rates.

3. The system of claim 2, wherein the processing unit is further programmed to combine the received audio with the captured sequences of video images.

4. The system of claim 1 further comprising an audio speaker that provides audio from a remote user to a subject.

5. The system of claim 1, wherein battery power is conserved by powering up only when at least one event condition in a set of event conditions is detected.

6. The system of claim 5, wherein the event condition is one of a first event condition that is powered up when the accelerometer vibrates for amount of time predefined by the remote user and a second event condition that is powered up when the internal clock reaches one or more predefined times set by the remote user throughout a day.

7. The system of claim 5, wherein powering up comprises turning the wireless module on to establish a Wi-Fi connection.

8. The system of claim 1, wherein the push message sent to the remote user in response to the detected event condition requests that the remote user provide a selective instruction comprising one or more of an instruction to control the wireless streaming video device to stream video captured from a subject's point of view, an instruction to maintain an exclusive Wi-Fi only mode of power consumption, another instruction to control the real time streaming video device to stream video, an instruction to do not disturb the remote user for a predefined amount of time, or an instruction to completely power off the wireless streaming video device until the next event condition is triggered.

9. The system of claim 1 further comprising a remote computing device that can connect to the processing unit via the wireless module to program a set of event conditions.

10. The system of claim 9, wherein the programmed set of event conditions are saved while Wi-Fi connectivity is established prior to powering off the real time streaming video device.

* * * * *